US010337926B2

(12) United States Patent
Van Buggenhout et al.

(10) Patent No.: US 10,337,926 B2
(45) Date of Patent: Jul. 2, 2019

(54) LOW-DRIFT INFRARED DETECTOR

(71) Applicant: MELEXIS TECHNOLOGIES NV, Tessenderlo (BE)

(72) Inventors: Carl Van Buggenhout, Aalst (BE); Karel Vanroye, Sint-Truiden (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 16/191,733

(22) Filed: Nov. 15, 2018

(65) Prior Publication Data
US 2019/0154511 A1 May 23, 2019

(30) Foreign Application Priority Data
Nov. 17, 2017 (EP) .................................... 17202450

(51) Int. Cl.
*G01J 5/02* (2006.01)
*G01J 5/12* (2006.01)
*G01J 5/22* (2006.01)
*G01J 5/00* (2006.01)

(52) U.S. Cl.
CPC ........... *G01J 5/0225* (2013.01); *G01J 5/0003* (2013.01); *G01J 5/12* (2013.01); *G01J 5/22* (2013.01)

(58) Field of Classification Search
CPC .......... G01J 5/0003; G01J 5/0225; G01J 5/12; G01J 5/22
See application file for complete search history.

(56) References Cited

U.S. PATENT DOCUMENTS

| 4,910,409 A | 3/1990 | Hoffman et al. |
| 2010/0213374 A1 | 8/2010 | Meinel et al. |
| 2016/0169738 A1 | 6/2016 | Van Der Wiel |
| 2016/0178443 A1 | 6/2016 | Emadi et al. |

OTHER PUBLICATIONS

European Search Report from EP Application No. 17202450, dated May 16, 2018.

*Primary Examiner* — Mark R Gaworecki
(74) *Attorney, Agent, or Firm* — Workman Nydegger

(57) ABSTRACT

A semiconductor device for measuring IR radiation comprising: at least one sensor pixel; at least one reference pixel shielded from said IR radiation comprising a heater; a controller adapted for: measuring a responsivity by applying power to the heater, while not heating the sensor pixel; measuring a first output signal of an unheated pixel and a first reference output signal of the heated pixel, obtaining the responsivity as a function of a measure of the applied power to the heater and of the difference between the first output signal and the first reference output signal; applying a period of cooling down until the temperature of the reference pixel and the sensor pixel are substantially the same; generating the output signal indicative of the IR radiation, based on the difference between the sensor and the reference output signal, by converting this difference using the responsivity.

15 Claims, 4 Drawing Sheets

LOW-DRIFT INFRARED DETECTOR

FIELD OF THE INVENTION

The invention relates to the field of semiconductor devices and methods for sensing infrared (IR) radiation. More in particular, the invention relates to such devices which use one or more sensor pixels and one or more reference pixels.

BACKGROUND OF THE INVENTION

Thermal IR sensors and methods of measuring IR radiation by means of semiconductor circuits, in particular by making use of MEMS structure suspended in a cavity, and comprising a temperature sensor, are well known in the art.

Most IR sensors transfer an incoming IR signal into a temperature increase of a thermally isolated structure (referred to herein as "absorber") arranged for absorbing the IR radiation. The absorber is typically a so called membrane or diaphragm suspended in a sealed cavity by means of a suspension structure (e.g. long and thin beams). It's noted that the absorber feature is not limited to a dedicated absorbing layer, but is seen as the general feature of the detector to collect IR radiation by means of absorption. The more IR-power the isolated structure receives, the higher the temperature of the absorber will be with respect to the bulk (substrate and cap). For each amount of IR radiation, there is an equilibrium temperature at which the heating-up due to the incident IR power equals the heat loss from the absorber to the surrounding substrate and cap via heat conduction, heat convection and heat radiation. The temperature increase of the absorber is thus an indication of the amount of incident IR radiation, and is typically measured by means of a resistor with a high temperature dependence (bolometer) or by means of a series of thermocouples (thermopile). In this document the heat absorber with temperature sensor is referred to as a "pixel".

For good sensitivity of the pixel, the temperature output signal would preferably be as large as possible for a given amount of IR-radiation power. The sensitivity of such a pixel is determined by three physically different gain factors: The first factor is determined by transmission, absorption and reflection of the IR light through the lid or cap onto the absorber. The second gain factor is determined by the thermal heat resistance between the absorber and the bulk of the device. This second factor especially depends on the heat resistance through the suspension structure (e.g. beams) of the thermally isolated structure and the heat resistance through the surrounding gas. The third factor is determined by the thermometer which is typically a resistor with high temperature dependence or a series of thermocouples (thermopile).

The stability and linearity of such a sensor clearly depends on the stability and linearity of the different gain factors, and often compromises have to be made between signal amplification and amplification stability. One of the most difficult parameters to control is the heat conduction from the absorber through the gas that surrounds the absorber.

The problem is that the sensitivity of infrared detectors can change over time due a potential change over time of the heat conduction from the absorber through the gas that surrounds the absorber. This could be induced by e.g. any small outgassing process, any small hermeticity leakage or any small permeability which would result in a change of the internal system pressure. This would finally lead to an error in the output signal.

SUMMARY OF THE INVENTION

It is an object of embodiments of the present invention to provide a good semiconductor device and method for operating such a device.

The above objective is accomplished by a method and device according to the present invention.

In a first aspect embodiments of the present invention relate to a semiconductor device for measuring IR radiation originating from outside the semiconductor device. The semiconductor device comprises:
a semiconductor substrate with a cap hermetically sealed to said substrate to enclose at least one cavity,
at least one sensor pixel arranged in the cavity, comprising a first absorber arranged for receiving said IR radiation, and adapted for generating a sensor output signal indicative of the incoming IR radiation,
at least one reference pixel arranged in the cavity, comprising a second absorber, and a heater for increasing the temperature of the second absorber by applying a power to that heater, wherein the reference pixel is shielded from said IR radiation, and adapted for generating a reference output signal indicative of the applied power to the heater,
wherein the semiconductor device comprises a controller adapted for:
measuring a responsivity of the semiconductor device by:
  applying a power to the heater of the reference pixel, while not heating the sensor pixel,
  measuring a first output signal of the unheated sensor pixel or of an unheated additional reference pixel and a first reference output signal of the heated reference pixel,
  obtaining the responsivity as a function of a measure of the applied power to the heater and of the difference between the first output signal and the first reference output signal,
applying a period of cooling down of the reference pixel until the temperature of the reference pixel is substantially the same as the temperature of the sensor pixel,
generating the output signal indicative of the IR radiation, based on the difference between the sensor output signal of the sensor pixel and the reference output signal of the reference pixel measured when the temperature of the sensor pixel is substantially equal to the temperature of the reference pixel, by converting this difference into the output signal which is indicative of the IR radiation using the measured responsivity.

It is an advantage of embodiments of the present invention that the responsivity of the semiconductor device can be obtained by heating the reference pixel and by measuring the difference in response of the heated reference pixel and the non-heated sensor pixel.

It is an advantage of embodiments of the present invention that the sensor pixel and the reference pixel are present in the same cavity (meaning that at least a channel in the cavity ensures that the pressure of the gas is the same for the sensor pixel and for the reference pixel) and therefore are subject to the same changes in the cavity (e.g. of the pressure in the cavity). Therefore the responsivity of the reference pixel is a good indication for the responsivity of the sensor pixel.

It is an advantage of embodiments of the present invention that the responsivity can be obtained at the start of a measurement sequence or later on in the sequence. Even more than one measured responsivity may be used for converting the difference between the sensor output signal and the reference output signal into the output signal which is indicative for the IR radiation.

In embodiments of the present invention the controller is adapted for obtaining the responsivity by making the difference between the first output signal and the first reference output signal and by dividing it by the applied power to the heater.

In embodiments of the present invention the controller is adapted for measuring the responsivity of the semiconductor device by:
measuring a second sensor output signal of the at least one unheated sensor pixel or of the unheated additional reference pixel and a second reference output signal when the reference pixel is substantially at the same temperature as the sensor pixel or as the additional reference pixel,
obtaining the at least one responsivity as a function of
the difference between the first output signal and the first reference output signal,
the difference between the second sensor output signal and the second reference output signal,
and of the applied power to the heater.

It is an advantage of embodiments of the present invention that the responsivity of the semiconductor device can be measured for semiconductor devices for which the IR radiation is causing an excitation on the sensor pixel output signal which is not negligible compared to the output signal induced by the electrical power in the heater.

In embodiments of the present invention the controller is adapted for obtaining the responsivity by making the difference between the first output signal and the first reference output signal minus the difference between the second sensor output signal and the second reference output signal to obtain a result, and by dividing this result by the applied power to the heater.

In embodiments of the present invention the controller is adapted for measuring the responsivity at least twice and for generating the output signal indicative of the IR radiation, by converting the difference between the sensor output signal and the reference output using at least two responsivities.

It is an advantage of embodiments of the present invention that changes in the responsivity of the semiconductor device, can be compensated for by measuring the responsivity more than once. It is moreover advantageous that the accuracy of the obtained responsivity can be improved by measuring the responsivity more than once and by combining the results (e.g. by averaging).

In embodiments of the present invention the controller is adapted for repetitively generating the output signal indicative of the IR radiation.

It is an advantage of embodiments of the present invention that changes in the IR radiation can be detected since they are regularly measured.

In embodiments of the present invention the controller is adapted for measuring the responsivity of the semiconductor device and for applying a period of cooling down of the at least one reference pixel in between two generated output signals.

It is an advantage of embodiments of the present invention that the responsivity of the semiconductor device is regularly updated. This responsivity may change over time due to changes in the cavity (e.g. the pressure in the cavity or the gas composition in the cavity).

In embodiments of the present invention the controller is adapted for obtaining the output signal indicative of the IR radiation by subtracting a predefined offset value of the device from the difference between the sensor output signal and the reference output signal measured when the temperature of the sensor pixel is substantially equal to the temperature of the reference pixel, and by dividing the result of the subtraction by a sensitivity wherein the sensitivity corresponds with the latest measured responsivity or a combination of measured responsivities multiplied with a predefined coupling efficiency.

In embodiments of the present invention the sensitivity is compensated based on a ratio of an earlier measured responsivity and the latest measured responsivity.

Thus changes of the responsivity which occur over time due to changes in the cavity (e.g. the pressure in the cavity or the gas composition in the cavity) can be compensated for. The predefined coupling efficiency which is calibrated in the factory is a function of the responsivity of the device during that calibration step in the factory. It is an advantage of embodiments of the present invention that an error due to a difference between the actual coupling efficiency and the predefined coupling efficiency can be compensated for using the ratio of the earlier measured responsivity and the latest measured responsivity.

In embodiments of the present invention the at least one sensor pixel comprises a heater for increasing the temperature of the first absorber by applying a power to that heater, wherein the controller is adapted for measuring the mismatch in heat conduction between the sensor pixel and the reference pixel.

In embodiments of the present invention the at least one sensor pixel comprises a thermopile for generating a sensor output signal indicative of the incoming IR radiation and the at least one reference pixel comprises a thermopile for generating a reference output signal indicative of the applied power to the heater.

It is an advantage of embodiments of the present invention that a thermopile sensor inherently has no offset. Therefore it is sufficient to use only one heater power to measure the responsivity.

In embodiments of the present invention the thermopile comprises a series of thermocouples.

In a second aspect embodiments of the present invention relate to a method for measuring IR radiation. The method comprises:
providing a semiconductor device comprising:
  a semiconductor substrate with a cap hermetically sealed to said substrate to enclose at least one cavity,
  at least one sensor pixel arranged in the cavity, comprising a first absorber arranged for receiving said IR radiation, and adapted for generating a sensor output signal indicative of the incoming IR radiation,
  at least one reference pixel arranged in the cavity, comprising a second absorber, and a heater for increasing the temperature of the second absorber by applying a power to that heater, wherein the reference pixel is shielded from said IR radiation, and adapted for generating a reference output signal indicative of the applied power to the heater,
measuring a responsivity of the semiconductor device by:
  applying a power to the heater of the reference pixel, while not heating the sensor pixel,
  measuring a first output signal of the unheated sensor pixel or of an unheated additional reference pixel and a first reference output signal of the heated reference pixel, obtaining the responsivity as a function of the difference between the first output signal and the first reference output signal and of the applied power to the heater, applying a period of cooling down of the reference pixel until the temperature of the reference pixel is substantially the same as the temperature of the sensor pixel, generating the output signal indicative of the IR radiation, based on the difference between the sensor output signal of the sensor pixel and the reference output signal of the reference pixel measured when the temperature of the sensor pixel is substantially equal to the temperature of the reference pixel, by converting this difference into the output signal which is indicative of the IR radiation using the measured responsivity.

In embodiments of the present invention measuring the responsivity of the semiconductor comprises:

measuring a second sensor output signal of the at least one unheated sensor pixel or of the unheated additional reference pixel and a second reference output signal when the reference pixel is substantially at the same temperature as the sensor pixel or as the additional reference pixel, obtaining the at least one responsivity as a function of
   the difference between the first output signal and the first reference output signal,
   the difference between the second sensor output signal and the second reference output signal,
   and of the applied power to the heater.

In embodiments of the present invention the method comprises repetitively generating the output signal indicative of the IR radiation.

In embodiments of the present invention the method comprises measuring the responsivity of the semiconductor device and applying a period of cooling down of the at least one reference pixel in between two generated output signals.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
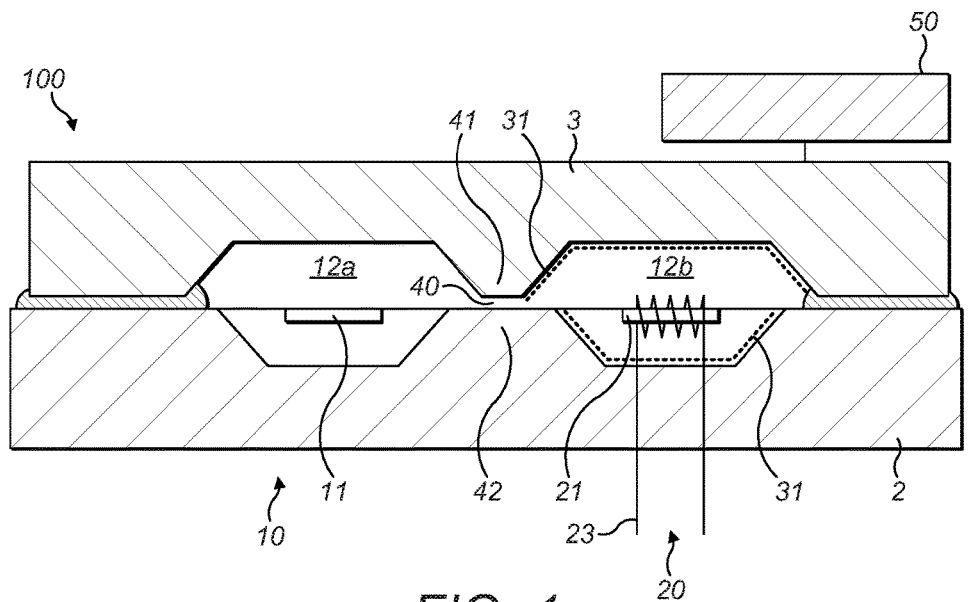
FIG. 1 shows a schematic drawing of a semiconductor device in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to the responsivity of the semiconductor device, reference is made to the ratio of the output signal of the reference pixel and the heating power applied to the reference pixel. Where in embodiments of the present invention reference is made to the sensitivity of the sensor pixel, reference is made to the ratio of the output signal of the sensor (minus the offset of the sensor pixel) and the power of the incoming radiation to the sensor pixel.

Where in embodiments of the present invention reference is made to the coupling efficiency, reference is made to the ratio of the sensitivity and the responsivity.

Where in embodiments of the present invention reference is made to a cavity, reference is made to an enclosed volume between a cap and a substrate. The cap is thereby hermetically sealed to the substrate. One or more walls may be present in the cavity to form compartments in the cavity, as long as at least an opening (e.g. a channel) is present between the compartments of the cavity thus making sure that the gas pressure in the cavity is the same in the different compartments of the cavity.

In a first aspect embodiments of the present invention relate to a semiconductor device 100 for measuring IR radiation originating from outside the semiconductor device 100.

An exemplary embodiment of such a device is illustrated in the schematic drawing of FIG. 1. The semiconductor device 100 comprises a semiconductor substrate 2 with a cap 3 hermetically sealed to said substrate to enclose at least one cavity 12.

At least one sensor pixel 10 is arranged in the cavity 12. This sensor pixel comprises a first absorber 11 arranged for receiving IR radiation originating from outside of the cavity. The sensor pixel is adapted for generating a sensor output signal indicative of the incoming IR radiation.

The semiconductor device moreover comprises at least one reference pixel 20 arranged in the cavity 12. The reference pixel comprises a second absorber 21, and a heater 23 for increasing the temperature of the second absorber 21 by applying a power to that heater. The reference pixel is adapted for generating a reference output signal indicative of the applied power to the heater. In this example the gas pressure in the cavity is the same for the reference pixel as for the sensor pixel. This is achieved by the channel 40.

In the exemplary embodiment illustrated in FIG. 1 a wall 41 is present in the cap and a wall 42 is present in the substrate. The channel 40 is present between these two walls. Because of the walls, two compartments 12a and 12b are formed in the cavity 12. The gas pressure in both compartments is the same. The sensor pixel is in the first compartment 12a comprises and the reference pixel is in the second compartment 12b.

The semiconductor device 100 moreover comprises a controller 50 adapted for measuring 220 a responsivity of the semiconductor device by:
applying a power to the heater 23 of the reference pixel 20, while not heating the sensor pixel 10,
measuring a first output signal of the unheated sensor pixel 10 or of an unheated additional reference pixel and a first reference output signal of the heated reference pixel 20,
obtaining the responsivity as a function of a measure of the applied power to the heater and of the difference between the first output signal and the first reference output signal,
applying 230 a period of cooling down of the reference pixel 20 until the temperature of the reference pixel 20 is substantially the same as the temperature of the sensor pixel 10,
generating 240 an output signal indicative of the IR radiation by:
    measuring a sensor output signal of the unheated sensor pixel 10 or of an unheated additional reference pixel and a reference output signal of the reference pixel 20.
    generating the output signal indicative of the IR radiation, based on the difference between the sensor output signal and the reference output signal measured when the temperature of the sensor pixel is substantially equal to the temperature of the reference pixel, by converting this difference into the output signal which is indicative of the IR radiation using the measured responsivity.

Figure 3:
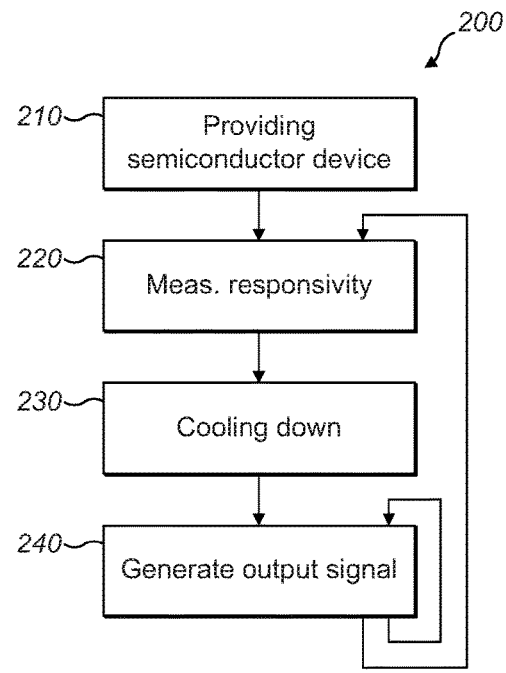
FIG. 3 is a flow chart of steps of a method for measuring IR radiation, in accordance with embodiments of the present invention.

The controller is adapted for performing a number of steps which are: measuring the responsivity 220, applying 230 a period of cooling down of the reference pixel, generating 240 an output signal. These steps are illustrated in FIG. 3 in which a possible sequence of these steps are illustrated in a flow chart. This flow chart is illustrative for a method 200 for measuring IR radiation in accordance with a second aspect of the present invention. The method starts with providing 210 a semiconductor device comprising at least one sensor pixel and at least one reference pixel and at least one heater for heating the reference pixel. Next the steps are applied which are explained in the previous paragraphs.

In embodiments of the present invention the at least one reference pixel 20 and the at least one sensor pixel 10 are electrically and thermally matched pixels. Electrically matched implies that if they have the same temperature, they have substantially the same output signal. Thermally matching implies that they have substantially the same heat conduction from the absorber through the gas that surrounds the absorber. The sensor pixel 10 (also called live pixel) is able to receive the IR radiation from the object space, while the reference pixel 20 (also called blind pixel) is shielded from the direct IR radiation from the object space. This shielding can be e.g. in the optical domain. In the example of FIG. 1 the reference pixel 20 is shielded from said IR radiation using a IR blocking layer 31. In this example the IR blocking layer is inside the cavity. More specifically it is in the second compartment 12b of the cavity. The side of the wall 40 which is enclosing the second compartment is also covered with the IR blocking layer. It may, however, be located on a different position. In this example the IR blocking layer 31 is also present at the bottom side, although the invention is not limited to this case. In order to minimize the direct signal towards the reference pixel, the IR blocking layer shall be positioned where external IR radiation is expected to enter in the cavity of the reference pixel. Alternatively the material properties of a portion of the device could be tuned in a predefined way to absorb or reduce the direct external IR radiation towards the reference pixel.

In embodiments of the present invention, heating power is applied to one or more pixels to compensate for a change of the heat conduction over time. In embodiments of the present invention the output signal of the at least one reference pixel and the output signal of the at least one sensor pixel are preferably measured at substantially the same moment. This may be simultaneously or with a time difference which is smaller than the time constant of the pixels, for example smaller than 100 ms or even smaller than 10 ms or even smaller than 10 us. In embodiments of the present invention the output signal indicative of the IR radiation may be repetitively generated. In that case the output signal of the at least one reference pixel and the output signal of the at least one sensor pixel are repetitively measured. They may be measured simultaneously or with a time difference which is smaller than the period between consecutive measurements, or even smaller than half of the period, or even smaller than 10% of the period, or even smaller than 5% of the period. The advantage thereof is that thermal noise of the pixels can be reduced, which is a major advantage for the accuracy of the measurement. In this case an instantaneous differential measurement of the sensor and the reference pixel in each timeslot is preferred to minimize the thermal and electrical noise and/or reduce the impact of common mode noise signals. In embodiments of the present invention the at least one reference pixel and the at least one sensor pixel are measured together by connecting the pixels in anti-series. This combined signal can then be amplified. This means that the difference of the signals from these pixels is amplified as an output signal. The difference of the signals from these pixels might be obtained by connecting the same polarities of the pixels together or could alternatively be obtained with switches to select the pixels to be connected with same or with opposite polarities—which results in the summation or in the differential signal from these pixels. Likewise the thermal and electrical noise of the pixels and/or the impact of common mode noise signals can be minimized.

Figure 4:
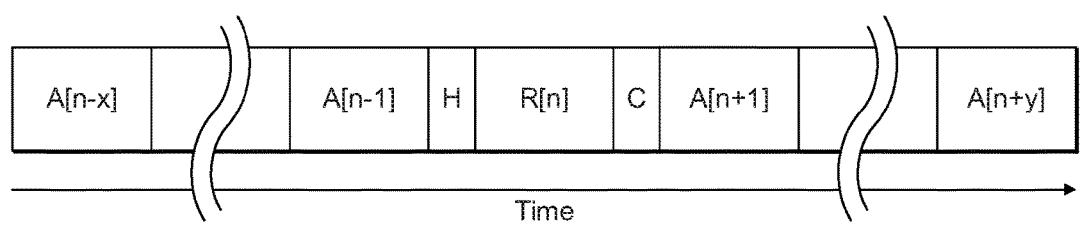
FIG. 4 shows a possible sequence of time slots in accordance with embodiments of the present invention.

As illustrated in FIG. 4 a step 220 wherein the responsivity is measured, and hence also wherein the reference pixel is heated, is followed by a cooling down step 230, which is followed by a step 240 wherein the output signal is generated. Generating the output signal might preferably be done by measuring the at least one reference pixel and the at least one sensor pixel together—in a very similar way as described above for the Responsivity measurement. Likewise the thermal and electrical noise of the pixels and/or the impact of common mode noise signals can be minimized. Generating the output signal may be done repetitively without each time measuring the responsivity. However, it is also possible that regularly the responsivity is measured 220 again, such that any changes in the responsivity can be detected.

FIG. 4 shows a possible sequence of time slots in accordance with embodiments of the present invention. In this figure the time slots are indicated by a rectangle:

A[x]: these are the application time-slots; here the incoming IR radiation is measured for application purposes (i.e. for generating 240 an output signal indicative of the IR radiation).

H: is the timeslot to heat up the pixel by means of an electrical power induced in the heater located on the pixel. Heating up of the reference pixel is done to measure 220 the responsivity of the semiconductor device. After this time slot the reference pixel has reached a stable temperature.

C: is the time slot to actively cool down the pixel or passively let the pixel cool down again to normal application level after it was heated with the on-pixel heater resistor.

R[x]: is the time slot for measuring the effect of the introduced power, which is maintained during the full timeslot (such that the temperature of the reference pixel is stable during this time slot), on the output of the reference pixel. This output signal is used to obtain the responsivity of the semiconductor device. This R[x] time slot is not necessarily the same duration as the A[x] time slot.

The period of cooling down of the reference pixel may be applied until the temperature of the reference pixel is substantially the same as the temperature of the sensor pixel. Both temperatures may for example be considered as substantially the same if they are differing only 1 mK, or only 0.5 mK, or only 0.1 mK. This may for example be achieved after a cool down period between 2 ms and 500 ms, for example a cool down period of 200 ms.

In embodiments of the present invention the coupling factor indicates the ratio between a 1 degree change of the object under study and how this is seen by the sensor pixel of by a combination of sensor pixels (e.g. two sensor pixels). The coupling factor may for example be 1000. In that case 1 degree change in object temperature is seen as $1/1000$ degree (1 mK) by the sensor pixel(s). In that case a delta TO of 30 degree result in a change of 30*1 mK=~30 mK at the sensor pixel(s).

In embodiments of the present invention a current or voltage source is used for heating the absorber of the reference pixel. As an example heater current for heating the reference pixel is 200 µA. This may for example result in a 2K increase of the absorber (also sometimes called membrane) temperature (single pixel).

When measuring the responsivity the temperature of the reference pixel may for example be increased by 2K. After cooling down, during the application times slots, the measurements may for example be done with an accuracy of 0.1 degree C.

In that case the temperature difference for the reference pixel before and after the responsivity measurement should be less than 0.1/1000, or <0.1 mK.

This means the ratio between both is 0.1 mK/2K=0.005%, and given a first order system (which the cooling of membrane is), for this example it is required to wait 10 times the time constant. In an exemplary embodiment of the present invention the time constant may roughly between 2 and 10 ms, such that the cool down period may roughly be like 20 ms to 100 ms, eventually up to 500 ms.

In embodiments of the present invention the power may be applied to the heater by applying a fixed heater current. In that case a measure of the applied power to the heater is the fixed heater current. The heater current may be the same for all reference and/or sensor pixels for all dies on a wafer, or it may be different and calibrated for the different pixels separately (depending on the spread of the heater current between the different pixels. In embodiments of the present invention the heater current (when heating a pixel) and the heater resistor are assumed to be stable over time.

A measure of the applied power to the heater may also be the power itself. This power may for example be obtained by measuring the current through a heater resistor and the voltage over the heater resistor.

In embodiments of the present invention the voltage across the heater may be measured using an ADC. In that case the heater power may be estimate as:

$$\frac{V_{heater}^2}{R},$$

wherein R is the heater resistance. The reference pixels, sensor pixels and heater power (e.g. heater-voltage) may for example be measured during calibration at manufacturing and they may also be measured during application (when measuring the responsivity and when generating the output signal indicative of the IR radiation). The advantage thereof being that any drift of the heater (e.g. drift of a heater current source) can be compensated for by measuring the heater power (e.g. the heater voltage). The advantage moreover being that the responsivity can also be compensated versus the background or ambient or chip temperature. This may for example result in a chip dependent typical calibration parameter of the background or ambient or chip temperature dependency of the sensitivity of the device.

In embodiments of the present invention the background or ambient or chip temperature is recorded in the time slot R[x]. The advantage thereof being that the temperature-dependency of the Responsivity of the sensor can be compensated for. As is known to the person skilled in the art, the Responsivity of the sensor can be temperature-dependent because of the material properties of the metals, semiconductors and/or dielectrics used in the sensor and/or read-out circuit of the device and/or because of the pressure and/or the material properties of the gas mixture in the hermetically sealed cavity of the device and/or because of local heating of the sensor and/or the read-out circuit of the device which could change the local temperature.

In embodiments of the present invention the background or ambient or chip temperature is measured as part of the application measurement during A[x]. The advantage thereof being that the temperature-dependency of the Responsivity of the sensor can be compensated for. As is known to the person skilled in the art, the Responsivity of the sensor can be temperature-dependent because of the material properties of the metals, semiconductors and/or dielectrics used in the sensor and/or read-out circuit of the device and/or because of the pressure and/or the material properties of the gas mixture in the hermetically sealed cavity of the device and/or because of local heating of the sensor and/or the read-out circuit of the device which could change the local temperature. In embodiments of the present invention always the same heater power may be applied. This heater power may for example be the same during a moment of calibration and when doing the responsivity measurement. The heater may for example be stable over its lifetime and may for example be independent of the background or ambient or chip temperature. As such any drift in the ADC is nulled out, which is an advantage of an embodiment of the present invention.

In embodiments of the present invention the controller is adapted for obtaining the responsivity by making the difference between the first output signal and the first reference output signal and by dividing it by the applied power to the heater. The first output signal and the first reference output signal are thereby measured at the same time after heating of the reference pixel.

For thermal noise reasons, the output signal of the sensor pixel and the output signal of the reference pixel are measured and subtracted from each other. In embodiments of the present invention this may be done at each time slot R. The responsivity can then be obtained as follows:

$$\text{Responsivity} = \frac{(ref_{R[n]} - sensor_{R[n]})}{P_{R[n]}}$$

With P the electrical power into the heater of the reference pixel. This method for obtaining the responsivity assumes that the external IR radiation is causing a small excitation on the output signal of the sensor pixel, in comparison with the excitation induced by the electrical power in the heater on the output signal of the reference pixel.

In embodiments of the present invention the responsivity may be obtained by measuring the output signal of two reference pixels (a heated one and an unheated one). For thermal noise reasons, the pixel without induced power (pix_heater) and pixel with induced power (pix_noheater) are measured and subtracted from each other, at the R[n] time slot.

$$\text{Responsivity} = \frac{(pix_{heater_{R[n]}} - pix_{noheater_{R[n]}})}{P_{R[n]}}$$

The external IR radiation is not impacting the responsivity measured as it is not present in the reference pixel.

In embodiments of the present invention the controller is adapted for measuring the responsivity of the semiconductor device by:
measuring a second sensor output signal of the at least one unheated sensor pixel or of an unheated additional reference pixel and a second reference output signal when the reference pixel is substantially at the same temperature as the sensor pixel or as the additional reference pixel,
obtaining the at least one responsivity as a function of the difference between the first output signal and the first reference output signal,
the difference between the second sensor output signal and the second reference output signal,
and of the applied power to the heater.

In embodiments of the present invention the controller is adapted for obtaining the responsivity by making the difference between the first output signal and the first reference output signal minus the difference between the second sensor output signal and the second reference output signal to obtain a result, and by dividing this result by the applied power to the heater.

This method may be applied for obtaining the responsivity using at least one sensor pixel and at least one reference pixel and small electrical heater power. A possible implementation is further explained below. For thermal noise reasons, the sensor pixel and reference pixel are measured and subtracted from each other, at each time slot. Also in this case the sensor and reference pixel are preferably measured at substantially the same moment in time. This can for example be achieved by a simultaneous differential measurement of the sensor and the reference pixel in each timeslot. The advantage thereof that the thermal and electrical noise can be minimized and/or that the impact of common mode noise signals can be reduced.

$$\text{Responsivity} = -\frac{(sensor_{R[n]} - ref_{R[n]}) - (sensor_{A[n-1]} - ref_{A[n-1]})}{P_{R[n]}}$$

With P the electrical power into the heater of the reference pixel.

In embodiments of the present invention the controller is adapted for obtaining the output signal indicative of the IR radiation by subtracting a predefined offset value of the device from the difference between the sensor output signal and the reference output signal measured when the temperature of the sensor pixel is substantially equal to the temperature of the reference pixel, and by dividing the result of the subtraction by a sensitivity wherein the sensitivity corresponds with the latest measured responsivity or a combination of measured responsivities multiplied with a predefined coupling efficiency.

This is further explained in the following paragraph. For an ideal device, the sensitivity S is proportional to the device responsivity:

$$V_{device} = S \cdot P_{IR} + V_{off}$$

$$V_{device} = R \cdot \alpha \cdot P_{IR} + V_{off}$$

Where R is the device responsivity; α is the optical coupling efficiency; $P_{IR}$ is the infrared radiative power. $V_{off}$ is not the offset of the thermopile sensor, but is the offset of the device, which might be induced by other effects, like mismatch between pixels in the thermal domain, optical domain or electrical domain; or offset parameters of the complete transfer function (e.g. due to electrical offset of the electrical chain).

It is an advantage of embodiments that the heat conduction is included in the device responsivity. By using the heater on the reference (blind) pixel a value can be obtained which is proportional to the heat conduction from the absorber through the gas that surrounds the absorber. In embodiments of the present invention this corresponds with the responsivity.

In embodiments of the present invention the sensitivity is compensated for based on a ratio of an earlier measured responsivity and the latest measured responsivity. The earlier measured responsivity may for example be measured during calibration of the device in the factory.

That's a way to avoid the need for measuring the heater power, because the ratio of those two responsivities divides away twice the heater power (which, in embodiments of the present invention, may remain constant over time).

In embodiments of the present invention a higher heater power will reduce the impact of error-signals, hence the responsivity can be measured more accurately with higher heater power. When the heater power is increased, the membrane temperature will increase also, hence the sensitivity of the thermopile changes, and thus the responsivity will not reflect the actual responsivity in the A-time-slots. An optimum heater power needs to be determined.

Semiconductor devices according to embodiments of the present invention may comprise a plurality of pixels. It is possible that the responsivities of different pixels show a mismatch. This could be due to variation in the thermal or electrical domain between the different pixels.

In order to compensate for a mismatch of the heat conduction between different pixels, in embodiments of the present invention a heater may be integrated on different pixels and a mismatch of the responsivities of the different pixels may be obtained by measuring the responsivities using the procedures described above.

Figure 2:
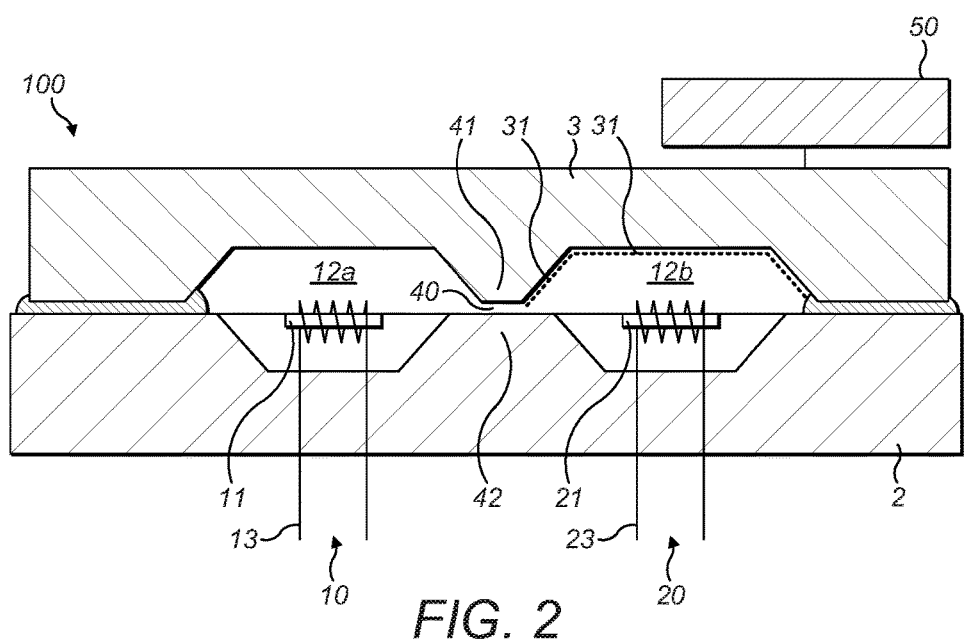
FIG. 2 shows a schematic drawing of a similar semiconductor device as in FIG. 1, except for the additional heater on the sensor pixel, in accordance with embodiments of the present invention.

In embodiments of the present invention the at least one sensor pixel 10 comprises a heater 13 for increasing the temperature of the first absorber 11 by applying a power to that heater, wherein the controller 50 is adapted for measuring the mismatch in heat conduction between the sensor pixel and the reference pixel. An example of such a semiconductor device is schematically drawn in FIG. 2. This is the same device as in FIG. 1 except for the additional heater 13.

Figure 5:
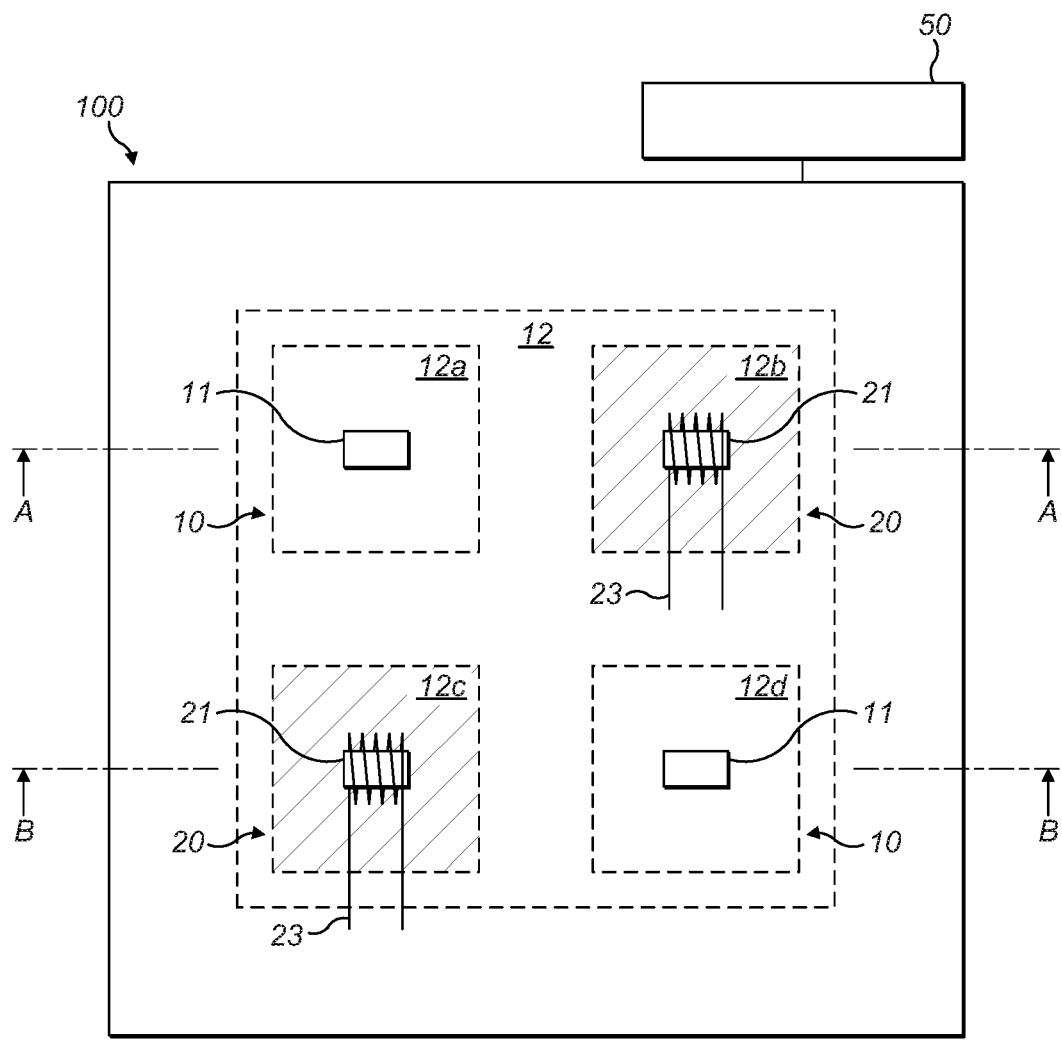
FIG. 5 shows a schematic drawing of the top view of a semiconductor device in accordance with embodiments of the present invention.

FIG. 5 shows a schematic drawing of the top view of a semiconductor device 100 in accordance with embodiments of the present invention. The semiconductor device comprises two sensor pixels 10 and two reference pixels 20 arranged in a cavity 12. Each sensor pixel 10 is comprising a first absorber 11. Each reference pixel 12 is comprising a second absorber 21. The cavity comprises 4 compartments 12a, 12b, 12c, 12d. Two of these compartments 12c, and 12d are blinded while two other compartments are transparent for the IR radiation. In this example the blinded pixels and the reference pixels are oriented diagonally with regard to each other. The invention is, however, not limited thereto and other configurations are also possible. In this exemplary embodiment of the present invention each reference pixel 20 also comprises a heater 23. The figure also schematically shows the controller 50.

Figure 6:
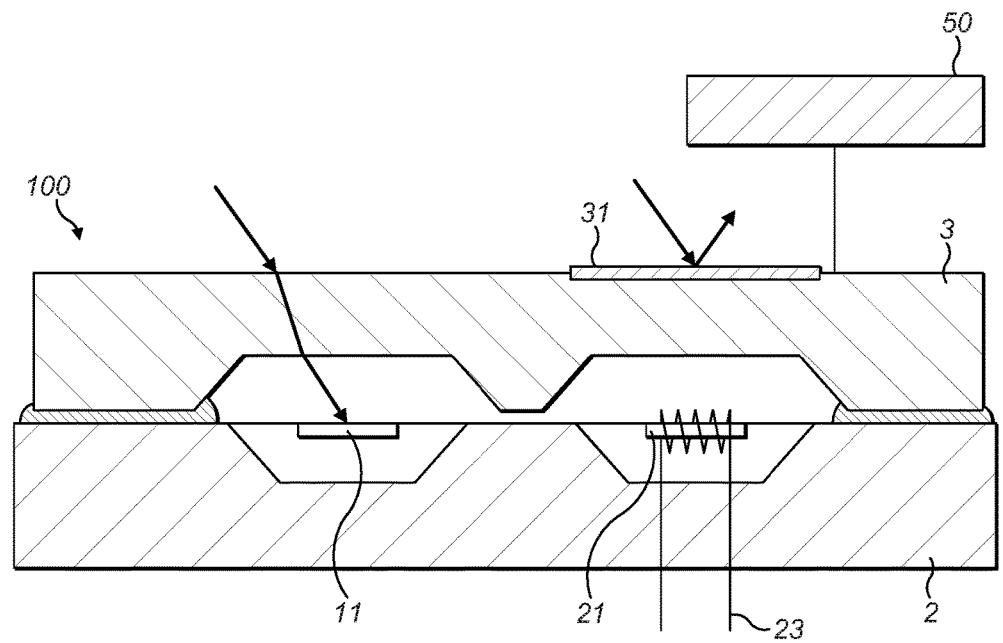
FIG. 6 shows a schematic drawing of the cross-section A-A indicated in FIG. 5.
Figure 7:
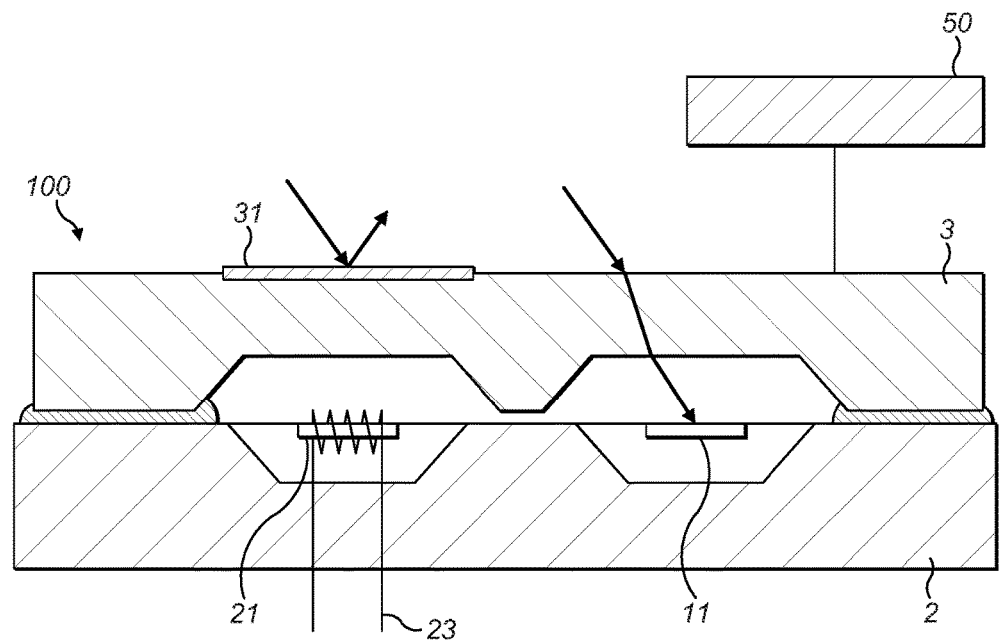
FIG. 7 show a schematic drawing of the cross-section B-B indicated in FIG. 5.

FIG. 6 shows a schematic drawing of the cross-section A-A indicated in FIG. 5 and FIG. 7 show a schematic drawing of the cross-section B-B indicated in FIG. 5. These figures show the substrate 2, the cap 3, the absorbers 11, 12, the heaters 23, and the IR-blocking layer 31. In this example the IR-blocking layer is a reflective coating on a top surface of the cap 3 substantially above the second absorber.

In particular embodiments of the present invention, the cap 3 can be made of a semiconductor material, such as for example germanium or, more preferably, silicon crystal, or more generally any other material that is transparent to the radiation of interest (infrared). Advantageously, such material also is substantially opaque (e.g. has a transmission coefficient of at most 0.2, for example at most 0.1) to any other radiation, especially visible light, which is a common source of noise in infrared sensors. Embodiments of the present invention are not limited in the way of fabrication of the pixel. In the example of FIG. 1 the pixels are based on forming a cavity in a cap 3 and a cavity in a basic substrate 2 being for example a CMOS, but embodiments of the present invention are not limited in the way of fabricating for example the cavity in the cap and the cavity in the CMOS. One example could be to create cavities by KOH etching, but other technologies exist too. The etch depth in the CMOS and the etch depth in the cap can be the same or can be different. Such a different etching depth can have a positive or negative effect on the parasitic thermal fluxes, as can be easily checked by the person skilled in the art.

The invention claimed is:

1. A semiconductor device for measuring IR radiation originating from outside the semiconductor device, comprising:
   a semiconductor substrate with a cap hermetically sealed to said substrate to enclose at least one cavity,
   at least one sensor pixel arranged in the cavity, comprising a first absorber arranged for receiving said IR radiation, and adapted for generating a sensor output signal indicative of the incoming IR radiation,
   at least one reference pixel arranged in the cavity, comprising a second absorber, and a heater for increasing the temperature of the second absorber by applying a power to that heater, wherein the reference pixel is shielded from said IR radiation, and adapted for generating a reference output signal indicative of the applied power to the heater,
   wherein the semiconductor device comprises a controller adapted for:
   measuring a responsivity of the semiconductor device by:
   applying a power to the heater of the reference pixel, while not heating the sensor pixel,
   measuring a first output signal of the unheated sensor pixel or of an unheated additional reference pixel and a first reference output signal of the heated reference pixel, obtaining the responsivity as a function of a measure of the applied power to the heater and of the difference between the first output signal and the first reference output signal, applying a period of cooling down of the reference pixel until the temperature of the reference pixel is substantially the same as the temperature of the sensor pixel, generating the output signal indicative of the IR radiation, based on the difference between the sensor output signal of the sensor pixel and the reference output signal of the reference pixel measured when the temperature of the sensor pixel is substantially equal to the temperature of the reference pixel, by converting this difference into the output signal which is indicative of the IR radiation using the measured responsivity.

2. A semiconductor device according to claim 1, wherein the controller is adapted for obtaining the responsivity by making the difference between the first output signal and the first reference output signal and by dividing it by the applied power to the heater.

3. A semiconductor device according to claim 1, wherein the controller is adapted for measuring the responsivity of the semiconductor device by:

measuring a second sensor output signal of the at least one unheated sensor pixel or of the unheated additional reference pixel and a second reference output signal when the reference pixel is substantially at the same temperature as the sensor pixel or as the additional reference pixel, obtaining the at least one responsivity as a function of the difference between the first output signal and the first reference output signal, the difference between the second sensor output signal and the second reference output signal, and of the applied power to the heater.

4. A semiconductor device according to claim 3, wherein the controller is adapted for obtaining the responsivity by making the difference between the first output signal and the first reference output signal minus the difference between the second sensor output signal and the second reference output signal to obtain a result, and by dividing this result by the applied power to the heater.

5. A semiconductor device according to claim 1, wherein the controller is adapted for measuring the responsivity at least twice and for generating the output signal indicative of the IR radiation, by converting the difference between the sensor output signal and the reference output using at least two responsivities.

6. A semiconductor device according to claim 1, wherein the controller is adapted for repetitively generating the output signal indicative of the IR radiation.

7. A semiconductor device according to claim 6, wherein the controller is adapted for measuring the responsivity of the semiconductor device and for applying a period of cooling down of the at least one reference pixel in between two generated output signals.

8. A semiconductor device according to claim 1, wherein the controller is adapted for obtaining the output signal indicative of the IR radiation by subtracting a predefined offset value of the device from the difference between the sensor output signal and the reference output signal measured when the temperature of the sensor pixel is substantially equal to the temperature of the reference pixel, and by dividing the result of the subtraction by a sensitivity wherein the sensitivity corresponds with the latest measured responsivity or a combination of measured responsivities multiplied with a predefined coupling efficiency.

9. A semiconductor device according to claim 8, wherein the sensitivity is compensated based on a ratio of an earlier measured responsivity and the latest measured responsivity.

10. A semiconductor device according to claim 1, wherein the at least one sensor pixel comprises a heater for increasing the temperature of the first absorber by applying a power to that heater, wherein the controller is adapted for measuring the mismatch in heat conduction between the sensor pixel and the reference pixel.

11. A semiconductor device according to claim 1, wherein the at least one sensor pixel comprises a thermopile for generating a sensor output signal indicative of the incoming IR radiation and wherein the at least one reference pixel comprises a thermopile for generating a reference output signal indicative of the applied power to the heater.

12. A method for measuring IR radiation, the method comprising:

providing a semiconductor device comprising:
a semiconductor substrate with a cap hermetically sealed to said substrate to enclose at least one cavity,
at least one sensor pixel arranged in the cavity, comprising a first absorber arranged for receiving said IR radiation, and adapted for generating a sensor output signal indicative of the incoming IR radiation,
at least one reference pixel arranged in the cavity, comprising a second absorber, and a heater for increasing the temperature of the second absorber by applying a power to that heater, wherein the reference pixel is shielded from said IR radiation, and adapted for generating a reference output signal indicative of the applied power to the heater, measuring a responsivity of the semiconductor device by:
applying a power to the heater of the reference pixel, while not heating the sensor pixel,
measuring a first output signal of the unheated sensor pixel or of an unheated additional reference pixel and a first reference output signal of the heated reference pixel,
obtaining the responsivity as a function of the difference between the first output signal and the first reference output signal and of the applied power to the heater,
applying a period of cooling down of the reference pixel until the temperature of the reference pixel is substantially the same as the temperature of the sensor pixel,
generating the output signal indicative of the IR radiation, based on the difference between the sensor output signal of the sensor pixel and the reference output signal of the reference pixel measured when the temperature of the sensor pixel is substantially equal to the temperature of the reference pixel, by converting this difference into the output signal which is indicative of the IR radiation using the measured responsivity.

13. A method according to claim 12, wherein measuring the responsivity of the semiconductor comprises:

measuring a second sensor output signal of the at least one unheated sensor pixel or of the unheated additional reference pixel and a second reference output signal when the reference pixel is substantially at the same temperature as the sensor pixel or as the additional reference pixel, obtaining the at least one responsivity as a function of the difference between the first output signal and the first reference output signal, the difference between the second sensor output signal and the second reference output signal, and of the applied power to the heater.

14. A method according to claim 12 the method comprising repetitively generating the output signal indicative of the IR radiation.

15. A method according to claim 14 the method comprising measuring the responsivity of the semiconductor device and applying a period of cooling down of the at least one reference pixel in between two generated output signals.

\* \* \* \* \*